United States Patent

Bischof et al.

(10) Patent No.: US 8,090,697 B2
(45) Date of Patent: Jan. 3, 2012

(54) MECHANISM FOR EXECUTING NESTED TRANSACTIONS IN AN EXECUTION ENVIRONMENT SUPPORTING FLAT TRANSACTIONS ONLY

(75) Inventors: Joerg Bischof, Zurich (CH); Keith Whittingham, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/925,951

(22) Filed: Oct. 27, 2007

(65) Prior Publication Data

US 2008/0059965 A1  Mar. 6, 2008

Related U.S. Application Data

(63) Continuation of application No. 10/055,208, filed on Jan. 23, 2002, now Pat. No. 7,346,632.

(30) Foreign Application Priority Data

Feb. 22, 2001 (EP) ..................................... 01104203

(51) Int. Cl.
*G06F 17/30* (2006.01)
(52) U.S. Cl. ........................................ 707/703; 707/684
(58) Field of Classification Search .................. 707/703, 707/684
See application file for complete search history.

(56) References Cited

U.S. PATENT DOCUMENTS 5,956,506 A * 9/1999 Cobb et al. .................... 718/101
7,346,632 B2 * 3/2008 Bischof et al. ........................ 1/1
* cited by examiner

*Primary Examiner* — Cheryl Lewis
(74) *Attorney, Agent, or Firm* — Vazken Alexanian

(57) ABSTRACT

Disclosed is a means and a method for executing a nested transaction in an execution environment supporting flat transactions only. To process a StartTransaction operation within a nested transaction it is suggested to check whether the StartTransaction operation is on the first nesting level of the nested transactions. An actual transaction within the execution environment by issuing a corresponding StartTransaction is started only in the affirmative case but not otherwise. To process a CommitTransaction operation within a nested transaction to successfully terminate a transaction it is suggested to check whether the CommitTransaction operation is on the first nesting level of the nested transaction. An actual transaction within the execution environment will be terminated only by issuing a corresponding CommitTransaction operation in the affirmative case but not otherwise. To process a RollbackTransaction operation within a nested transaction aborting a transaction as unsuccessful, it is suggested to issue a corresponding RollbackTransaction operation within the execution environment independent from the nesting level of said RollbackTransaction operation.

Figure 1:
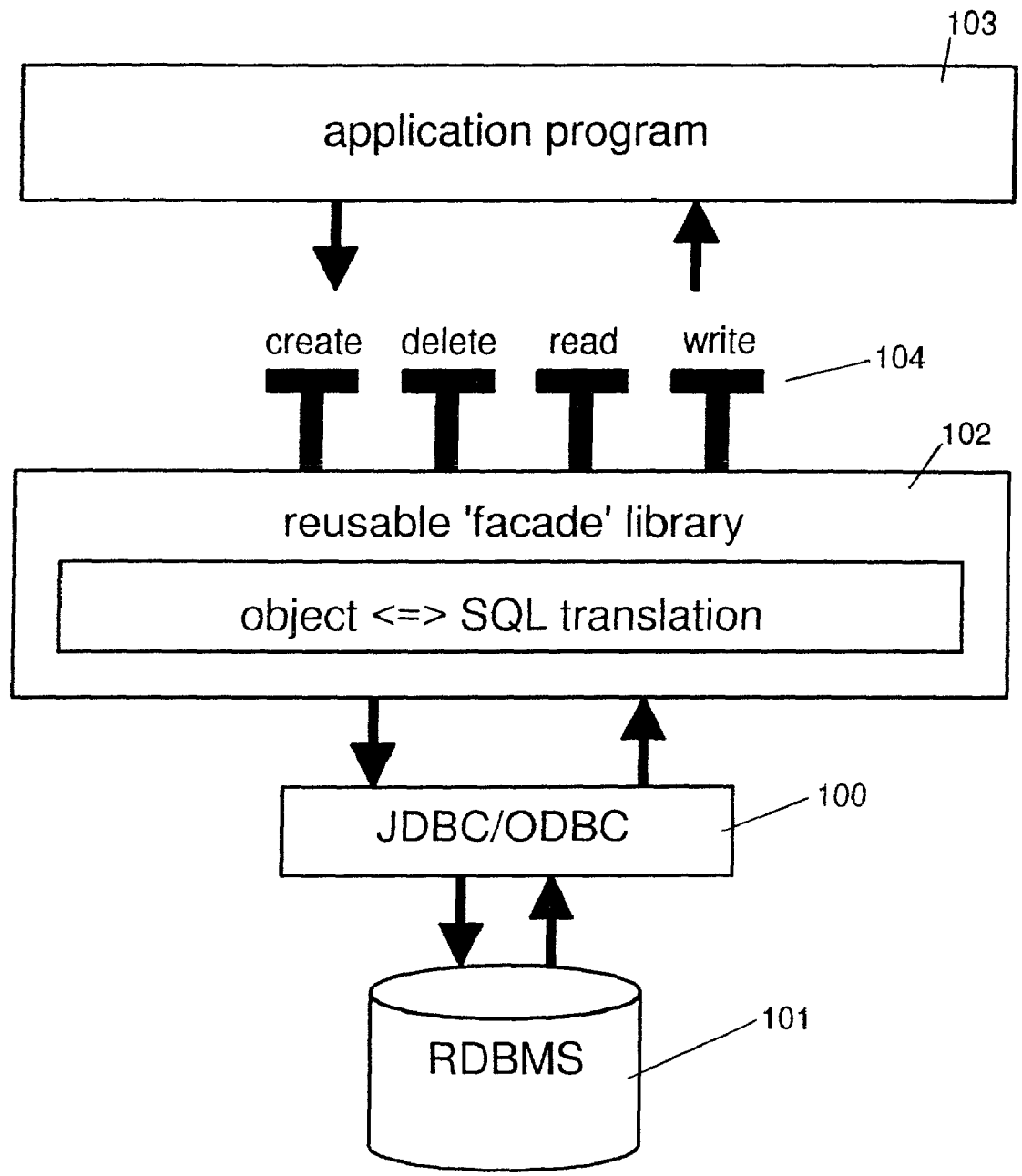

7 Claims, 3 Drawing Sheets ism for executing a nested transaction in an execution environment supporting execution of flat transactions only.

1. BACKGROUND OF THE INVENTION

1.1 Field of the Invention

The present invention relates to transaction processing technology. More particularly the current invention relates to means and a method for executing a nested transaction in an execution environment supporting execution of flat transactions only.

1.2 Description and Disadvantages of Prior Art

Transaction processing technology is exploited to administrate, manage and coordinate the flow of the multitude of concurrently processing transactions through the computer system. It orchestrates the commit and undo, i.e. rollback, of transactions as well as the recovery of objects, resource managers, or sites after they fail.

The above mentioned consistency requirement for a certain transaction and for all other concurrently processing transactions in the local or distributed transaction system is more accurately expressed as the ACID requirement. Actually ACIDicity is a combination of four different sub-requirements:

- atomicity A transaction's changes to the state of the overall system are atomic; either all happen or none happen. This so-called all-or-nothing property ensures that either the transaction completes successfully or aborts and has no effect on data or resources in general. These changes include all changes to resources including database changes, messages, actions on transducers and so forth.
- consistency A transaction is a correct transformation of the system state. The actions taken as a group do not violate any of the integrity constraints associated with the state. This requires that the transaction be a correct program. As the result data are in a consistent state before the transaction starts and they are again in a consistent state after the transaction has finished.
- isolation Even though transactions execute concurrently, it appears to each transaction T, that other transactions execute either before T or after T, but not both. Therefore intermediate states and intermediate changes to resources of one transaction are not visible to the other transactions. This principle is also commonly referred to as serializability.
- durability Once a transaction completes successfully and it commits its activities, its changes to the state survive failures, i.e. the state changes (changes to resources) became permanent after the transaction has completed successfully. In terms of object oriented programming for instance this is referred to as persistence.

Various types of transaction models do exist.

The simplest form of a transaction model is the flat transaction which comprises all operations within a StartTransaction and EndTransaction statement; the EndTransaction statement may be represented by a CommitTransaction or RollbackTransaction statement.

A more sophisticated transaction model is the nested transaction wherein within an outermost transaction a multitude of further transactions nested to any arbitrary depth are encapsulated.

These concepts are described in further details for instance by J. Gray "Transaction Processing: Concepts and Techniques", 1992. Morgan Kaufmann Publishers. ISBN: 1558601902.

One problem created by this coexistence of different transaction models is that programs written for and performing a nested transaction cannot be executed within an execution environment supporting a flat transaction model only. A further problem area relates to the area of program development. In terms of intelligibility and maintainability programs are to be designed as modular as possible without context dependencies between different modules to be paid attention to by a programmer. The smaller the context to which a programmer has to pay attention, the less programming errors will occur. The most well-known programming paradigm realizing this principle is the object oriented programming concept. Real world functions, which have to be executed as a single transaction, do require that many objects would have to be manipulated within a single transaction. Exploiting the nested transaction model, complex context situations can be avoided for instance by enclosing individual modifications of an object as encapsulated transactions. But in case the execution environment, for instance the underlying database storing the object data, does not support a nested transaction model this even would have an undesired influence on the programming style; larger programming contexts will have to be established to guarantee the transactional execution of more complex operations. A well-known example of execution environments which support flat transaction models only are access interfaces to relational database systems.

1.3 Objective of the Invention

The invention is based on the objective to provide an approach for executing a nested transaction in an execution environment supporting a flat transaction only.

2. SUMMARY AND ADVANTAGES OF THE INVENTION

The objectives of the invention are solved by the independent claims. Further advantageous arrangements and embodiments of the invention are set forth in the respective subclaims.

The present invention relates to means and a method for executing a nested transaction in an execution environment supporting flat transactions only.

To process a StartTransaction operation within a nested transaction it is suggested to check whether the StartTransaction operation is on the first nesting level of the nested transactions. An actual transaction within the execution environment by issuing a corresponding StartTransaction is started only in the affirmative case but not otherwise.

To process a CommitTransaction operation within a nested transaction to successfully terminate a transaction it is suggested to check whether the CommitTransaction operation is on the first nesting level of the nested transaction. An actual transaction within the execution environment will be terminated only by issuing a corresponding CommitTransaction operation in the affirmative case but not otherwise.

To process a RollbackTransaction operation within a nested transaction aborting a transaction as unsuccessful it is suggested to issue a corresponding RollbackTransaction operation within the execution environment independent from the nesting level of said RollbackTransaction operation.

The suggested approach has the significant advantage that it supports to execute a nested transaction in an execution environment supporting a flat transaction only. The current invention provides all transactional benefits to the application as if it would really execute a nested transaction.

3. BRIEF DESCRIPTION OF THE DRAWINGS

FIG. 1 gives an overview of how to implement the current invention within a facade library representing a mediator between the application environment and the execution environment for transactions.

Figure 2:
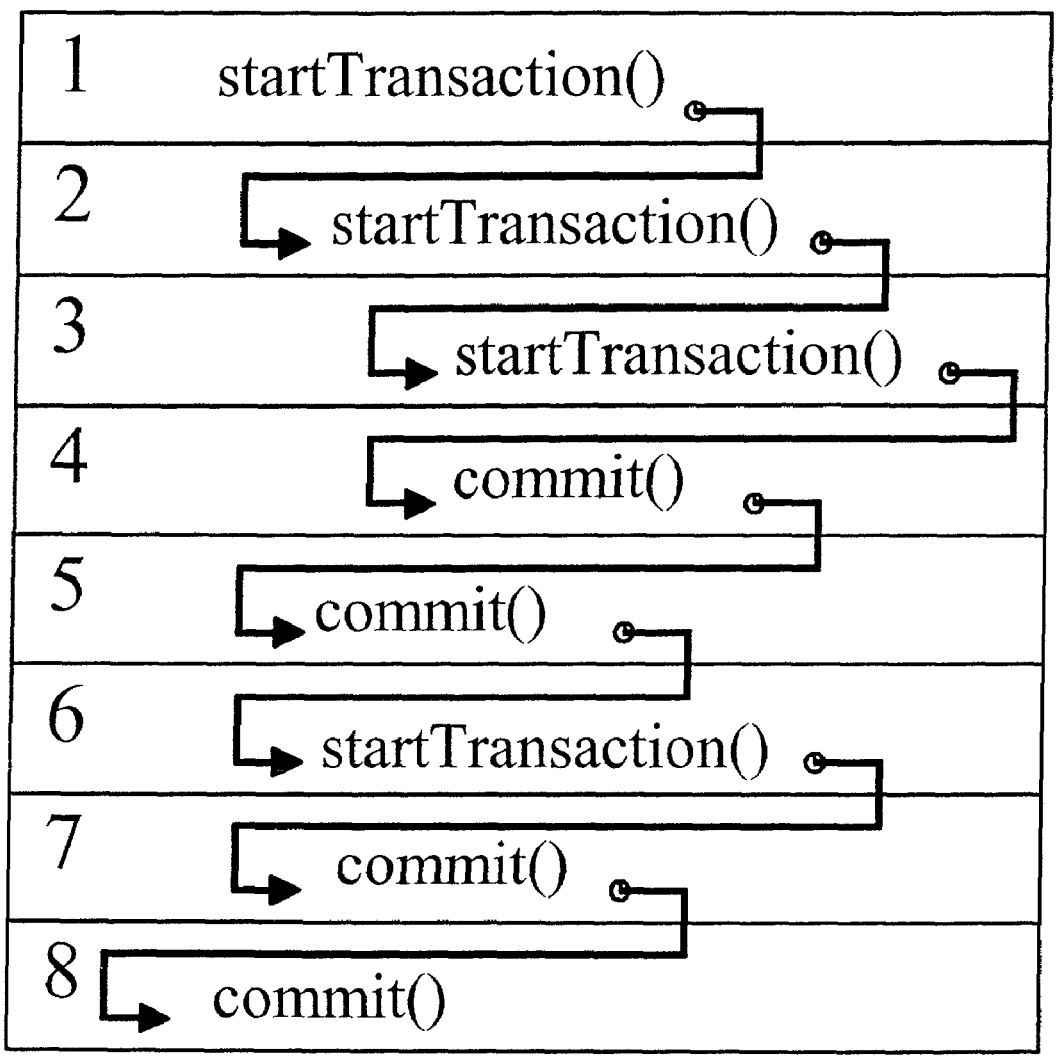

FIG. 2 shows an example of a transaction hierarchy.

Figure 3:
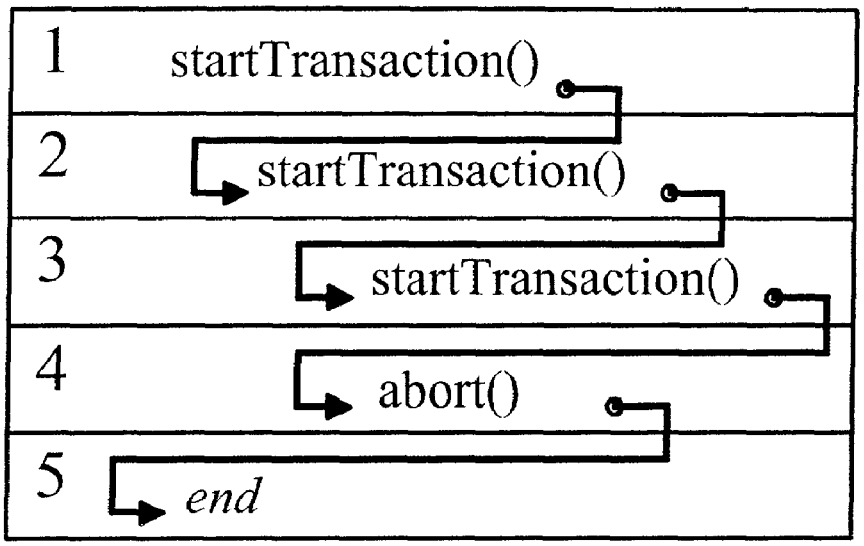

FIG. 3 reflects an example showing that any RollbackTransaction operation will terminate the complete nested transaction independent from the nesting level of the RollbackTransaction operation.

Figure 4:
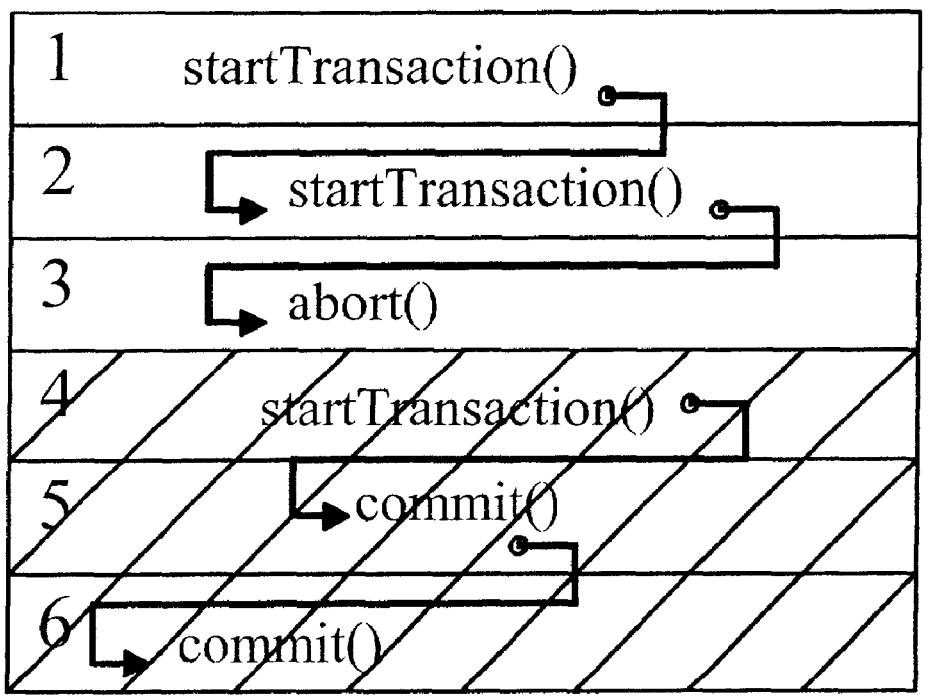

FIG. 4 visualizes a consequence of the fact that a RollbackTransaction operation will abort the entire transaction hierarchy of the nested transaction.

4. DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The principles of the current invention are being described within the context of an object oriented environment, as provided for instance by C++ or JAVA, in combination with relational database interfaces, as provided for instance by ODBC (open database connectivity) or JDBC (JAVA database connectivity). This description should not be understood as a limitation of the proposed invention as the proposed concepts may be applied to any execution environment supporting flat transaction models only.

4.1 Introduction

Relational database management systems are a well established means of storing data that continue to offer considerable advantages over alternatives. The application programming interface commonly available to object oriented programming languages such as C++ and Java often only supports flat transactions although proper application program structure dictates that nested transactions are necessary in order to maintain data consistency. The current invention proposes a novel mechanism whereby nested transactions can be emulated on top of the flat transaction model and, using this model, applications can be written to guarantee the consistency of data in a transactional way.

Shedding further light on the background of the current invention the following four most important aspects making the invention beneficial are pointed out:

the need to make application programs written in object oriented languages reliable and able to share data;

advantages that relational database systems offer over object based databases can be better exploited from within object oriented environments;

the shortcomings of the de facto standard programming interfaces to relational databases are overcome;

the practicalities of using facade libraries for relational database access is improved.

These aspects will be discussed in turn.

Writing Reliable Object Oriented Application Programs

Currently, among the most popular programming languages for writing applications are the object oriented languages C++ and Java. It is often required that the data manipulated by application programs is persistent and consistent. By persistence is meant that the data may 'outlive' the application program that created it and thus be usable by future instantiations of the application program or, indeed, by other applications. An example of this is a bank account record in a bank's database: the record must remain in the database as long as the customer has an account at that bank independently of the execution of programs that interact with the data stored in the record. By data consistency is implied that important relations between data items are maintained for all applications using the data. An example of this is that an account record cannot exist without a customer record; that is an account is meaningless without a customer. If a customer account record is deleted then, in order that the data remains in a consistent state, any account records relating to that customer must also be deleted.

Guaranteeing these persistent and consistent properties is difficult. To this end, the concepts and principles of transactions are use to solve these problems. Transactions, briefly, refer to a group of operations on potentially shared data with ACID properties as discussed above.

For the purpose of the current invention the following transaction models are of importance: the flat transaction and the nested transaction model.

A flat transaction is the simplest form of a transaction and is characterized by a:

begin or StartTransaction an explicit start of transaction and an end or EndTransaction that may either be a:

commit or CommitTransaction data operations requested since the start of transaction take effect or abort or RollbackTransaction data operations requested since the start of transaction are discarded and no change is made to the data. As far as changes to data occurred already they are rolled back.

Nested transactions allow one transaction to be embedded completely within another. The begin and end of the nested transaction must appear after the begin, and before the end of the encapsulating transaction:

```
begin 'encapsulating transaction'
    begin 'nested transaction'
    end            'nested transaction'
end            'encapsulating transaction'
```

In a nested transaction model, transactions may be nested to an arbitrary depth.

The current invention will enable that object oriented concepts including the nested transaction model may be exploited for programming even in case the underlying transaction execution environment supports flat transactions only.

Advantages of Using Relational Database Systems for Object Storage

Relational database management systems, RDBMSs, have become the standard data stores for on-line transaction processing. The monumental effort that has been invested into the performance optimization and data integrity together with their ubiquitousness and commercial acceptance make for a compelling argument to use them to store data used in object oriented application programs.

More recently object database management systems such as Object Design's ObjectStore provide a viable alternative but do not support many of the data integrity features that traditional RDBMSs do and have a much lower market penetration and acceptance.

The current invention prevents that any limitation of the transactional capabilities of the database management system will reflect on the programming level like for instance within an object oriented programming environment.

Shortcomings of Common Relational Database Interfaces

Application programs access RDBMSs using APIs: application program interfaces. The de facto API standard for relational database access is ODBC, open database connectivity. ODBC is a set of application programming interfaces, created by Microsoft, defining how to move information in and out of any database that supports the standard. ODBC is based on X/Open SQL CLI (call level interface) and uses human readable statements to access and manipulate the data stored in a database.

ODBC has limited support for transactions. A flat transaction model only is supported in one of two modes:

Autocommit Each statement is committed automatically after the request is processed. The start of transaction is implicit and is at start of database connection or after each processed request.

manual Statement groups may be either committed or rolled back (aborted) by calling the commit or rollback APIs as appropriate. Again the start of transaction is implicit and follows database connection or processing of the commit and rollback APIs. JDBC (providing the Java database connectivity) is similar to ODBC but is accessible to applications written in the Java programming language. JDBC has the same transactional capabilities as ODBC.

The Advantages of Using a Facade Library for Relational Database Access

Attention is now shifted to the application programs using the JDBC and ODBC interfaces. As preferred embodiment of the current invention FIG. 1 shows an architecture for using an RDBMS for data persistence. FIG. 1 gives an overview of how to implement the current invention within a facade library representing a mediator between the application environment and the execution environment for transactions. JDBC or ODBC 100 is used to access an RDBMS 101. A re-usable facade library 102 is situated between the application program 103 and the RDBMS API 100. The term 'facade' is one which describes a design pattern to provide a unified interface to a set of interfaces in a subsystem. The facade pattern defines a higher-level interface that makes the subsystem easier to use. In this case the library takes care of the translation of program objects to and from database tuples by way of the SQL statements supported by JDBC and ODBC.

The facade library offers several APIs 104 that allow the application program to manipulate the data stored in the RDBMS. A minimal set of operations to be performed on objects would be create, delete, read and write.

An application typically needs to write many different types of objects to the database. Although it is possible to write objects as binary images, it is not desirable as the application cannot benefit from many of the features of the RDBMS such as data constraints and the data is rendered unusable by other applications or even other versions of the same application. A much better method is to write individual data members of an object into different columns of, perhaps, several database tables. The data is still recognizable and readable; we call this property legibility. To achieve this a library can inspect the object's structure and use this information to write the data to appropriate columns and tables in the database. Such a library does not then need modification to be used with different versions of the same application or, for that matter, completely different applications with different object models.

An example of a problem scenario to which the current invention may be applied is the following: Often a suitable database schema for a given object model requires that more than one table be used to store a single object. To maintain legibility and consistency when writing a single object to the database, the facade library must use a transactional write. That is, all columns of all tables relating to the object must be updated completely or not at all. When the database access method only supports a flat transaction model (e.g. JDBC or ODBC) then this single level of transactional capability is effectively 'used up'. The application can only safely update a single object in this way.

For applications even of moderate complexity, situations arise when flat transactions are inadequate. Considering a situation where a transfer needs to be made from a current account to a savings account, the two account objects, currentAccount and savingsAccount, are loaded into memory. The amount to be transferred is deducted from the currentAccount object and added to the savingsAccount object. Now the application must write both objects; there are two alternatives:

1. A) write currentAccount, B) write savingsAccount
2. A) write savingsAccount, B) write currentAccount These operations are essentially the same but the write order is reversed. In both cases a window exists between the two write operations where, in the event of a program crash, the database would be left in an inconsistent state.

To support complex operations such as the example above it is highly desirable to have access to nested transactions. Without the support of a nested transaction model deficiencies of a flat transaction model within the database execution environment will "shine through" and will influence the programming style in an unacceptable manner on the application programming level.

Such an outcome would be achieved for instance if one would try to solve the problem by letting the application control the start and the end of a transaction. By exposing the control of start and end of transaction the application could 'hold off' the commit operation until the two writes complete.

Whilst this does indeed solve the replacement problem one must consider what this implies for the application program. Typically an operation such as the account transfer could occur in a series of semantically higher and higher level operations: a transfer operation might be a part of a close account operation. When writing the transfer operation the programmer would be likely to begin and end the transaction—again using up the only available transaction. Otherwise large programming contexts will have to be accepted on the programming level which have to be controlled by a programmer explicitly with respect to their transactional behavior and which, due to their increased complexity, are quite error prone. Moreover, reusability of the modules participating within this transactional programming context is reduced as reusing such a module would force an exploiter to establish transactional control himself explicitly.

Another approach for trying to solve the problem could consist in the introduction of additional interfaces, which undesirably would increase the interface complexity. Referring to the above bank transfer account example one could imagine that a new operation is provided by the facade library that would effectively perform the transfer (i.e. write both objects) on behalf of the objects themselves; such an additional operation could be for instance a writeObjects operation. This does, indeed, solve the transfer problem but one can imagine ever increasingly complex operations which an application may require, making it necessary, but implausible, to add an infinite number of operations.

4.2 The General Solution Mechanism

The solution proposed in this section describes an implementation of a mechanism to emulate nested transactions on database interfaces supporting only flat transactions. The implementation is in a facade library called ObjectSQL written in the Java programming language.

ObjectSQL has a class called 'Store' which provides access to a database via JDBC. The class provides the following key methods:

| | |
|---|---|
| createObject( ) | Create an object in the database |
| writeObject( ) | Write an object to the database |
| queryObject( ) | Locates and reads an object from the database |
| deleteObject( ) | Delete object from the database |
| startTransaction( ) | Create and return a transaction object |

The operations of the first four methods are self evident. The startTransaction( ) method creates a new object of the class Transaction that in turn has the following methods:

| | |
|---|---|
| commit( ) | Commit this transaction and, as a convenience to the programmer, all previous transactions in the transaction hierarchy. The commit is only propagated to the database if this is the root transaction of the transaction hierarchy |
| abort( ) | Abort (rollback) this and all other transaction objects in this transaction hierarchy |

When several transactions are nested a transaction hierarchy is created.

FIG. 2 shows an example of a transaction hierarchy. The transaction hierarchy starts with the first call Store.startTransaction( ) at 1. Subsequent calls to Store.startTransaction( ) (at 2, 3 and 6) increase the transaction nesting level. Calls to Transaction.commit( ) (at 4, 5, 7 and 8) reduce the nesting level. The call to Transaction.commit( ) at 8 terminates the hierarchy. The outermost encapsulating transaction, i.e., that starting at step 1 and ending at step 8 in FIG. 2, defines the scope of the transaction and is called the hierarchy root.

As the underlying database API only supports flat transactions the suggestion of the current invention is that only the root transaction's commit can be allowed to reach the database. Expressed in more general terms the fundamental teaching of the current invention is to check for each individual StartTransaction operation if it is on the first nesting level of a nested transaction or not; of course in a preferred embodiment of the current invention the detailed nesting level of each StartTransaction is monitored. Finally, a corresponding StartTransaction operation within the underlying execution environment is issued on the first nesting level only but not otherwise. This approach prevents the single available transaction scope within the execution environment from being "used up". It is further suggested to check each individual EndTransaction operation, in case it is a CommitTransaction operation successfully terminating a transaction, for whether said EndTransaction operation is on said first nesting level of a nested transaction. A corresponding CommitTransaction operation within the execution environment will be issued only in case the CommitTransaction terminates the outermost nesting level but not otherwise. Again this approach prevents the single available transaction scope within the execution environment from being "used up" by terminating the nested transaction scope too early.

For example, in FIG. 2 it is the commit operation at step 8 that must cause the data to be updated persistently by ending the transaction. Other CommitTransaction operations like for instance 4, 5 and 7 will not terminate the single transaction scope within the execution environment, establishing a "hold-off" effect of the current teaching.

This 'hold-off' is achieved by means of a depth counter. As each transaction starts, the depth counter, initially zero, is incremented. In a similar manner, as each transaction commits, the depth counter is decremented. If the commit process results in a depth counter value of zero then one knows that it is the outermost encapsulating transaction and one passes the commit operation to the database API causing all modifications to take effect.

In a preferred embodiment of the current invention it is suggested to administrate the depth counter within the above mentioned startTransaction( ), commit( ) and abort( ) calls. The first call of startTransaction( ) and the last call of commit( ) within the nested transaction will trigger the corresponding transaction operation within the flat transaction models of the execution environment to be issued.

4.3 The Mechanism For Aborting A Nested Transaction

In general a transaction is aborted as unsuccessful by issuing a RollbackTransaction operation (called abort( ) in the current implementation). To appropriately deal with the single transaction scope within the execution environment, the current invention suggests in the case where an EndTransaction operation being a RollbackTransaction operation aborting a transaction as unsuccessful is detected, that a corresponding RollbackTransaction operation within the execution environment is issued independent from the nesting level of the RollbackTransaction operation. Moreover, according to the current invention once a RollbackTransaction operation has been executed within a nested transaction, any further StartTransaction operation or any further EndTransaction operation within said nested transaction independent from its nesting level will be rejected as being in error without issuing a corresponding StartTransaction operation or a corresponding EndTransaction operation to the execution environment.

Thus, in essence and due to the underlying flat transaction models of the execution environment, a RollbackTransaction operation aborts all transactions within the current hierarchy of the nested transaction.

FIG. 3 reflects an example wherein the abort operation at step 4 aborts the transactions started at 1, 2 and 3, that is, the whole nested transaction will be aborted.

A consequence of the fact that a RollbackTransaction operation will abort the entire transaction hierarchy of the nested transaction, is visualized within FIG. 4. The example of FIG. 4 is being based on the example of FIG. 3, further assuming an abort( ) operation within the second nesting level at position 3. According to the behavior described above, the shaded area (comprising the steps 4, 5 and 6) in FIG. 4 illustrates an erroneous attempt to continue a transaction. The abort( ) at step 3 aborts, not only the transaction started at step 2 but also the outermost encapsulating transaction started at step 1. Operations relating to steps 4, 5 and 6 will be rejected as being in error.

4.4 Further Advantages

As shown above the proposed mechanism to emulate nested transactions on top of database interfaces offering only a flat transaction model is necessary in order to write reliable applications which share or require persistent or consistent data.

The proposed teaching is both important and valuable as system architects reject object oriented databases and move back to the traditional and ubiquitous relational databases solution for application development.

The invention removes the limitation in ODBC and JDBC, which support flat transactions only.

Moreover, the current invention offers a migration path for the execution environments (like for instance ODBC and JDBC) allowing them to incorporate nested transaction models in future extensions of the execution environments. Based on the current invention already today application programs could be written according to the nested transaction paradigm. The facade library, implementing the support for nested transactions as discussed above, simply has to be removed once the corresponding support is provided within the execution environment without affecting the applications.

Another area of applicability of the current invention is smart card systems. Due to their limited computing resources their transactional capabilities may be limited to execute flat transactions only. The current invention proposes a technique allowing to execute nested transactions even on these limited systems.

The invention claimed is:

1. A computerized method comprising: executing a nested transaction for computing data in an execution environment supporting a flat transaction only, and wherein a nested transaction encapsulates between a first StartTransaction operation and a corresponding first EndTransaction operation on a first nesting level a hierarchy of one or more further StartTransaction operations and corresponding further EndTransaction operations on further nesting levels, wherein a StartTransaction operation starts a transaction; and wherein an EndTransaction operation ends a transaction; wherein a facade library provides access from an object oriented environment to a relational database system, having a transaction object comprises a depth counter, a CommitTransaction operation, and a RollbackTransaction operation as object methods, and said method further comprising performing a StartTransaction operation by,
checking whether said StartTransaction operation is on the first testing level of said nested transaction, and
issuing a corresponding StartTransaction operation within said execution environment only when said StartTransaction operation is on the first testing level of said nested transaction.

2. A computerized method for executing a nested transaction for computing data in an execution environment supporting a flat transaction only according to claim 1, said method performing an EndTransaction operation by:
checking, in case said EndTransaction operation is a CommitTransaction operation successfully terminating a transaction, whether said EndTransaction operation is on said first nesting level of said nested transaction, and
issuing a corresponding CommitTransaction operation within said execution environment only when said EndTransaction operation is on said first nesting level of said nested transactions.

3. A computerized method for executing a nested transaction for computing data in an execution environment supporting a flat transaction only according to claim 2, said method performing an EndTransaction operation in case said EndTransaction operation is a RollbackTransaction operation aborting a transaction as unsuccessful, by issuing a corresponding RollbackTransaction operation within said execution environment independent from the nesting level of said RollbackTransaction operation.

4. A computerized method for executing a nested transaction for computing data in an execution environment supporting a flat transaction only according to claim 3, said method performing, once a RollbackTransaction operation has been executed within said nested transaction, any further StartTransaction operation or any further EndTransaction operation within said nested transaction independent from its nesting level by rejecting it as being in error without issuing a corresponding StartTransaction operation or a corresponding EndTransaction operation to the execution environment.

5. A computerized method for executing a nested transaction in an execution environment supporting a flat transaction only according to claim 1, said method performing an EndTransaction operation for computing data by:
checking, in case said EndTransaction operation is a CommitTransaction operation successfully terminating a transaction, whether said EndTransaction operation is on said first nesting level of said nested transaction, and
issuing a corresponding CommitTransaction operation within said execution environment only when said EndTransaction operation is on said first nesting level of said nested transaction;
said method performing an EndTransaction operation in case said EndTransaction operation is a RollbackTransaction operation aborting a transaction as unsuccessful, by issuing a corresponding RollbackTransaction operation within said execution environment independent from the nesting level of said RollbackTransaction operation; and
said method performing, once a RollbackTransaction operation has been executed within said nested transaction, any further StartTransaction operation or any further EndTransaction operation within said nested transaction independent from its nesting level by rejecting it as being in error without issuing a corresponding StartTransaction operation or a corresponding EndTransaction operation to the execution environment.

6. A data processing program for execution in a data processing system comprising software code portions for performing a computerized method for executing a nested transaction for computing data in an execution environment supporting a flat transaction only, and wherein a nested transaction encapsulates between a first StartTransaction operation and a corresponding first EndTransaction operation on a first nesting level a hierarchy of one or more further StartTransaction operations and corresponding further EndTransaction operations on further nesting levels, wherein a StartTransaction operation starts a transaction; and wherein an EndTransaction operation ends a transaction; wherein a facade library provides access from an object oriented environment to a relational database system, having a transaction object comprises a depth counter, a CommitTransaction operation, and a RollbackTransaction operation as object methods, and said method further comprising performing a StartTransaction operation by,
- checking whether said StartTransaction operation is on the first nesting level of said nested transaction, and
- issuing a corresponding StartTransaction operation within said execution environment only when said StartTransaction operation is on the first nesting level of said nested transaction.

7. A computer program product stored on a computer usable medium, comprising computer readable program means for causing a computer to perform a method executing a nested transaction in an execution environment supporting a flat transaction only, and wherein a nested transaction encapsulates between a first StartTransaction operation and a corresponding first EndTransaction operation on a first nesting level a hierarchy of one or more further StartTransaction operations and corresponding further EndTransaction operations on further nesting levels, wherein a StartTransaction operation starts a transaction; and wherein an EndTransaction operation ends a transaction;
- wherein a facade library provides access from an object oriented environment to a relational database system, having a transaction object comprises a depth counter, a CommitTransaction operation, and a RollbackTransaction operation as object methods, and said method further comprising performing a StartTransaction operation by,
- checking whether said StartTransaction operation is on the first nesting level of said nested transaction, and
  - issuing a corresponding StartTransaction operation within said execution environment only when said StartTransaction operation is on the first testing level of said nested transaction.

* * * * *